United States Patent [19]

Olschewski et al.

[11] 4,235,480

[45] Nov. 25, 1980

[54] SEAL RING FOR DRILL BIT ASSEMBLIES

[75] Inventors: Armin Olschewski; Heinrich Kunkel, both of Schweinfurt; Manfred Brandenstein, Aschfeld; Lothar Walter, Schweinfurt, all of Fed. Rep. of Germany

[73] Assignee: SKF Kugellagerfabriken GmbH, Schweinfurt, Fed. Rep. of Germany

[21] Appl. No.: 969,005

[22] Filed: Dec. 13, 1978

[30] Foreign Application Priority Data

Dec. 21, 1977 [DE] Fed. Rep. of Germany ....... 2756929

[51] Int. Cl.³ .................... F16C 19/00; F16C 33/76
[52] U.S. Cl. .................................. 308/8.2; 175/372; 277/203; 277/204; 308/187
[58] Field of Search .............. 175/371, 372, 359; 277/203, 204, 93 R, 93 SD; 308/8.2, 187, 187.1, 187.2, 240, DIG. 8

[56] References Cited

U.S. PATENT DOCUMENTS

| 1,952,339 | 3/1934 | Solenberger | 277/204 X |
| 3,160,416 | 12/1964 | Ryffel | 277/203 X |
| 3,162,185 | 12/1964 | Knoblock | 277/203 X |
| 3,370,895 | 2/1968 | Cason | 308/8.2 |

*Primary Examiner*—Frederick R. Schmidt
*Attorney, Agent, or Firm*—Eugene E. Renz, Jr.

[57] ABSTRACT

A sliding seal ring for a drill bit comprising at least one cutter rotatably mounted on a journal forming part of the drill bit body. The seal ring is made of elastic metallic strip material and is of spiral configuration with the spirals in overlapping relation. The seal ring is mounted under axial tension between the pocket in an edge ring and the drill bit body and rotates with the cutter. In one form of the invention, the spirals are in abutting relation to provide a complete seal. In another form the spirals are open to define gaps permitting flow of flushing liquid to cool and lubricate the bearings supporting the cutter on the trunnion.

14 Claims, 6 Drawing Figures

SEAL RING FOR DRILL BIT ASSEMBLIES

BACKGROUND OF THE INVENTION

The present invention relates to drill bit assemblies used in the underground exploration of petroleum products. More specifically, the invention relates to a sliding seal ring preferably made of an elastic metallic strip material which seats in the drill bit assembly between the drill bit body and the rotary cutter with an initial axial tension.

A seal ring of this type is illustrated in U.S. Pat. No. 3,361,494. This seal ring is conically shaped in the nature of a plate spring. By reason of this shape it has only a small amount of elastic flexibility in an axial direction and none at all in a radial direction and this presents certain disadvantages and drawbacks when used in drill bit applications of the type to which the present invention relates. For example, in order to incorporate this known seal ring in a drill bit assembly with a certain predetermined initial tension which is necessary to provide a seal between the rotary cutter and the drill bit body, the sliding surfaces of the rotary cutter and drill bit body must be fabricated with very close tolerances since they determine the position of the seal ring and accordingly, its effectiveness to provide the necessary seal. Of course, maintaining these tolerances adds to the expense in the production of the drill bit assembly. Furthermore, the normal amount of wear which occurs in the assembly over a period of time produces a predetermined amount of radial and axial play in the bearings of the rotary cutter. As a result of this play, the known seal ring with its limited flexibility no longer elastically bridges the surfaces of the rotary cutter and drill bit body and thus loses its effective sealing function. The consequent penetration of drilling mud accelerates wear in the bearings caused by rock particles and the like which are no longer blocked out by the seal ring. Thus the entire assembly has a relatively brief service life or operating period.

Furthermore, as the bearing wear increases, the action of the rotary cutter on the drill bit body is no longer pure rotational but may be described as a tumbling motion which in the case of the conventional seal ring is at best only partly elastically absorbed. Additionally this tumbling motion deforms the conventional seal ring and damages it after a short life span by reason of overstressing due to the tumbling motion of the rotary cutter.

SUMMARY OF THE PRESENT INVENTION

With the above in mind, it is an object of the present invention to provide an improved seal ring characterized by novel features of construction and arrangement which does not lose its sealing efficiency even with substantial radial, axial and tumbling motions of the rotary cutter.

It is also an object of the present invention to provide a seal ring which can be produced economically and efficiently. To this end the seal ring is formed by a spirally wound strip of generally rectangular cross section with the individual spirals of the strip arranged in mutual overlapping relationship in axial or radial direction. The individual spirals are arranged in mutual contacting relationship with each other at their overlapping portions so that a flow agent cannot penetrate the spirals of the seal ring and the seal ring accordingly prevents the flow agent, such as the flushing liquid of the rotary cutter from penetrating into the bearing area.

In accordance with another feature of the present invention, the individual spirals form a relatively narrow sealing gap at their overlapping locations. This permits a certain amount of controlled flow of the flushing liquid to lubricate and cool the bearings. The narrow sealing gap is controlled so that larger rock particles do not flow through the gap into the bearing cavity and therein cause a harmful wear in the bearings of the rotary cutter. The spiral configuration of the seal ring permits the width of the sealing gap to be easily adjusted by simply elastically compressing the spirals in an axial direction or by elastic compression in a radial direction during assembly of the seal ring into the area between the rotary cutter and the drill bit body.

In accordance with still another feature of the present invention, the strip is coated with a friction reducing material such as copper.

In accordance with still another feature of the present invention, at least one axial end of the seal ring can mount a bearing ring made, for example, of a hard metal which slides on the sealing surface of the drill bit body or rotary cutter which it confronts and engages.

BRIEF DESCRIPTION OF THE DRAWING

These and other objects of the present invention and the various details of the construction there of are hereinafter more fully set forth with reference to the accompanying drawings, wherein.

DESCRIPTION OF THE PREFERRED EMBODIMENTS

Figure 1:
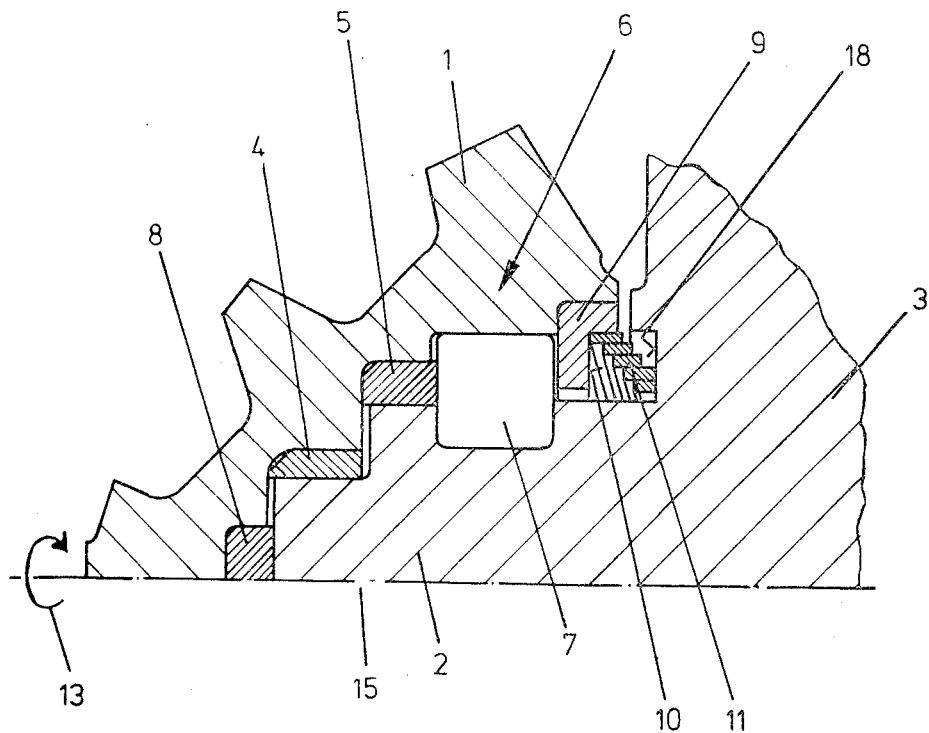
FIG. 1 is a fragmentary transverse sectional view through a drill bit assembly illustrating a seal ring constructed in accordance with the present invention.
Figure 2:
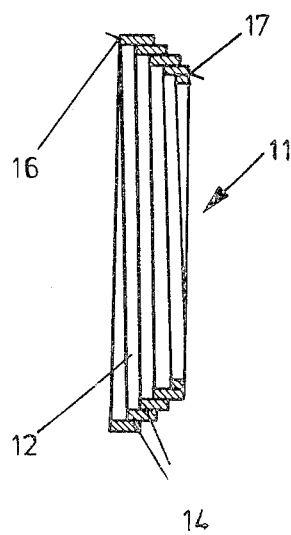
FIG. 2 is a transverse sectional view through the embodiment of seal ring illustrated in FIG. 1.

Referring now to the drawing and particularly FIG. 1 thereof there is illustrated a rotary drill bit assembly comprising a conventional rotary cutter rotatably supported in bearings on the trunnion 2 of the drill bit body 3. In the present instance, the bearing support comprises a pair of axially spaced friction bearings 4 and 5 and a roller bearing comprising a plurality of cylindrical rolling elements 7 mounted adjacent the friction bearing 5. An axial friction bearing 8 is disposed between the front face of the trunnion 2 and the tip of the rotary cutter which absorbs the axially directed operating pressure of the rotary cutter. The inner axial end face of the rotary cutter remote from the tip has an annular pocket for an edge ring 9 which is secured in the pocket, by well-known conventional process, for example, by welding. As illustrated the rolling elements 7 are laterally guided at one axial end face by the edge ring 9 and at the opposite end by the friction bearing 5. As illustrated in FIG. 1, the edge ring has an undercut or offset 10 defining a mounting surface for a seal ring 11. The seal ring 11 is held axially and radially in the bore of the edge ring at the offset 10.

In accordance with the present invention, the seal ring 11 consists of a flexible metallic strip material and is formed into a spirally wound strip 12 having a generally rectangular cross section. Note that in this instance the individual spirals of the strip 12 are arranged in overlapping relation in a radial direction. As illustrated, the seal ring 11 abuts the edge ring 9 at one axial end and the radial face of the drill bit body 18 adjacent the trunnion at the opposite axial end. The seal ring is mounted with a predetermined initial axial tension between the edge ring 9 and the drill bit body 3 in such a manner that it rotates with the cutter 1. The spirals are wound to define a spiral thread of a configuration so that when the rotary cutter 1 rotates in the direction indicated by the arrow 13, the spirals act as a forwarding screw thread so that any flushing liquid in the area of the rotary drill bit cutter which would tend to penetrate the seal ring 11 is pumped radially outwardly by a hydrodynamic action. Penetration of the flushing liquid into the bearing cavity of the rotary cutter is thus prevented.

As illustrated in the drawings, the opposite axial ends of the seal ring 11 have axial end faces disposed perpendicular to the axis 15 of the rotary cutter 1. The axial end face 17 which confronts and slides on the radial face 18 of the drill bit body adjacent the trunnion lies in an overlapping location formed over the entire periphery of the seal ring so that a relatively large end face 17 is obtained to provide good sliding and sealing properties. On the other hand the axial end face 16 of the seal ring 11 axially abuts the radial face of the pocket 10 and the seal ring 11 is tightly held in the bore of the edge ring 9 under an initial radial tension.

As illustrated, the individual spirals of the seal ring 11 are arranged in a predetermined manner so that they are in mutual contact with each other at their radially opposed overlapping locations 14 so that the bearing cavity of the rotary cutter 1 which is filled with a lubricant is completely sealed from the outside. This construction also permits a mutual axial sliding displacement of the individual spirals relative to one another producing an elastic bridging of the relative axial motions between the drill bit body 3 and the rotary cutter 1. These relative motions are produced in operation as the result of wear of the roller bearing 6 and the axial friction bearing 8.

In operation, the radial friction bearings 4 and 5 are also subject to wear and when this occurs, the rotary cutter generates radial motions and tumbling motions in relation to the drill bit body 3. These radial and tumbling motions are also elastically bridged by the seal ring 11 when the individual spirals bend and yield elastically and also partly slide over each other in a peripheral direction.

If desired, the strip 12 may be coated with a friction reducing material, for example, copper so that resistance to relative sliding of the spirals at the overlapping locations 14 is as small as possible, and therefore only relatively small frictional forces acting in these regions.

Figure 3:
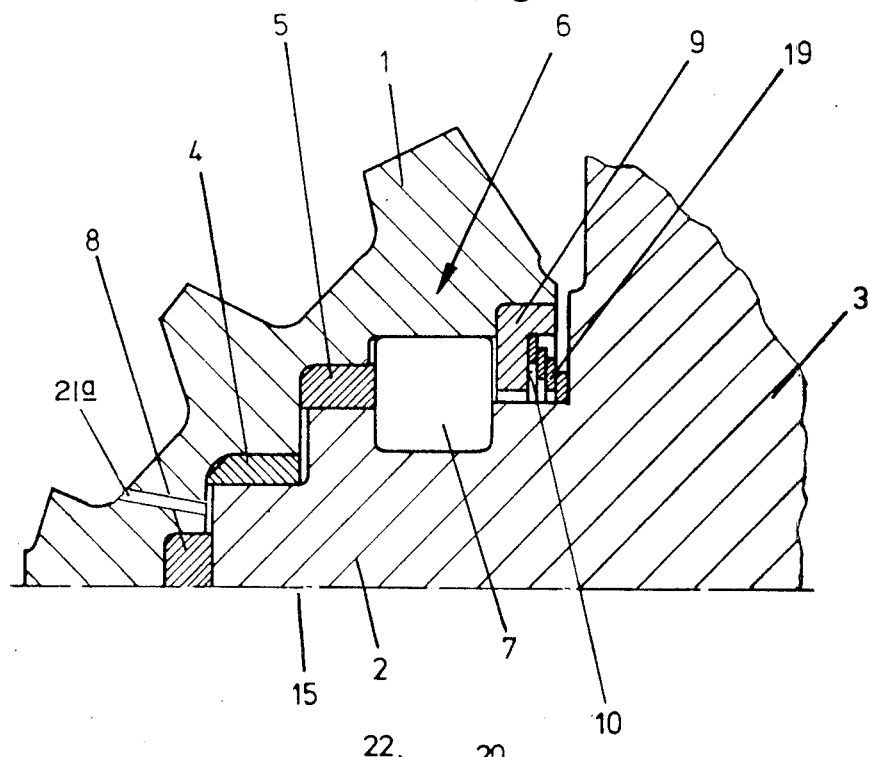
FIG. 3 is a fragmentary transverse sectional view of a drill bit assembly similar to FIG. 1 showing a modified form of seal ring in accordance with the present invention.
Figure 4:
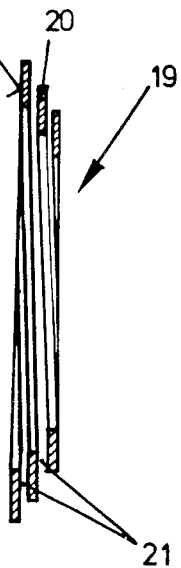
FIG. 4 is a transverse sectional view through the modified seal ring illustrated in FIG. 3.

There is illustrated in FIGS. 3 and 4 a modified form of seal ring 19 in accordance with the present invention which is shown in a drill bit assembly of the general construction and arrangement of that illustrated in FIG. 1. Thus, the assembly includes a rotary cutter 1 supported on the trunnion 2 of the drill bit body 3 by a series of bearings including two radial friction bearings 4 and 5, a roller bearing 6 comprising a series of cylindrical rollers 7 and an axial friction bearing 8 between the axial end face of the trunnion and the tip of the rotary cutter. The seal ring is mounted with an initial tension in the annular gap or a pocket between the edge ring 9 and the radial face of the drill bit body at the juncture of the trunnion and drill bit body and as illustrated consists, in the present instance, of a flexible metallic strip material in the shape of a spiral which has a generally elongated rectangular cross section in a radial direction. The strip is formed so that the spirals overlap one another in an axial direction. In this instance, the seal ring is formed so that the individual spirals are spaced apart axially and form a narrow sealing gap 21 at the overlapping locations so that the flushing liquid in the vicinity of the rotary cutter can flow through the narrow annular opening between the rotary cutter and the drill bit body through the spiral gaps 21 to the bearing cavity for the rolling bearing 6 in order to cool and lubricate the bearing. A flow opening $21^a$ may be provided in the wall of the rotary cutter 1 to facilitate continuous flow of flushing liquid through the bearings. The spacing of the gap 21 can be selectively controlled and maintained relatively narrow to prevent ingress of larger particles, such as drillings which are formed during the drilling operation which may result in harmful bearing wear.

The edge ring 9 is formed with a recess and is generally of inverted L-shaped cross section as in the previously described embodiment to define a support for the seal ring 19. By this mounting arrangement, the seal ring is guided radially on the trunnion 2 of the drill bit body 3 at the inner end facing the drill bit body and is also axially supported on the drill bit body 3. The seal ring 19 at its opposite axial end has a face 22 normal or perpendicular to the axis 15 of the rotary cutter 1 and this face slides on the radial face 10 of the pocket defined in the edge ring 19.

The width of the sealing gap defined by the overlapping and spaced spirals of the seal ring can be selectively varied by appropriate elastic compression of the seal ring during the assembly of the rotary cutter 1. The cross section and configuration of the seal ring may be selectively chosen and varied. Selection of the size and configuration of the seal ring is a factor in controlling the width of the sealing gaps 21.

Figure 5:
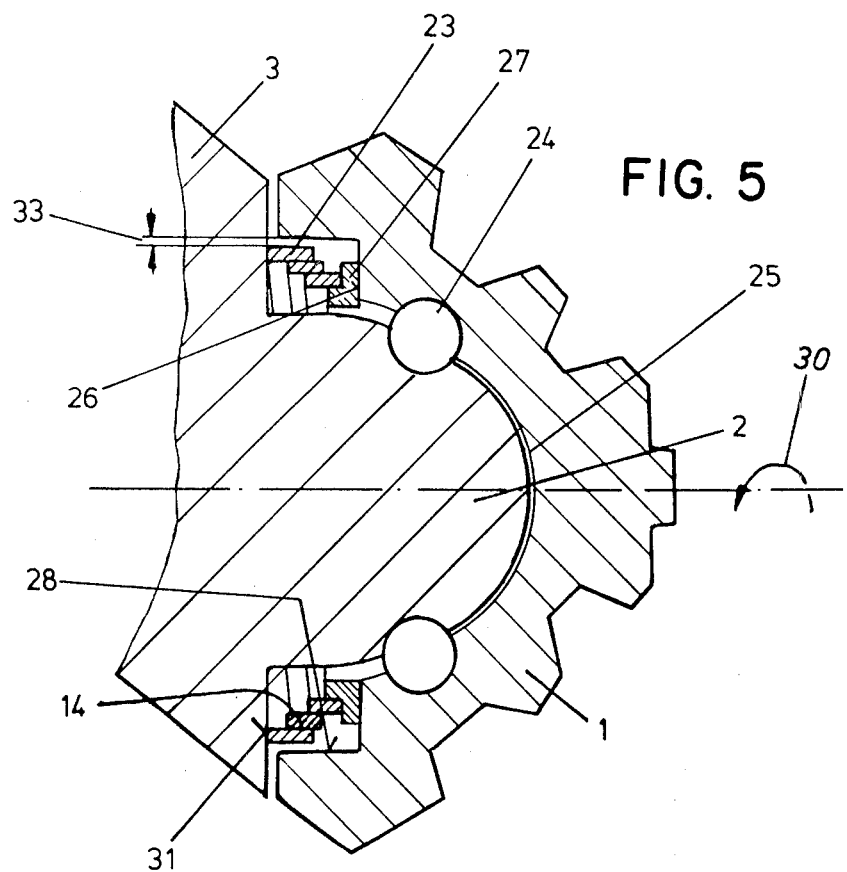
FIG. 5 is a fragmentary sectional view of a drill bit assembly incorporating still another embodiment of seal ring in accordance with the present invention.

There is illustrated in FIG. 5 another embodiment of seal ring for a drill bit in accordance with the present invention. The drill bit assembly is somewhat different structurally from that illustrated in the previous embodiments. However, it comprises the same basic elements, that is, a rotary cutter 1 rotatably supported on bearings on a trunnion 2 of a drill bit body 3. In the present instance, the trunnion 2 is of spherical shape and the interior of the rotary cutter is of a complementary configuration. The rotary cutter is supported on the trunnion by ball bearings 24 which ride in complementary arcuate raceways formed in the exterior peripheral surface of the trunnion 2 and the interior peripheral surface of the rotary cutter 1. The bearing support for the rotary cutter also includes a dome shaped friction bearing 25.

Figure 6:
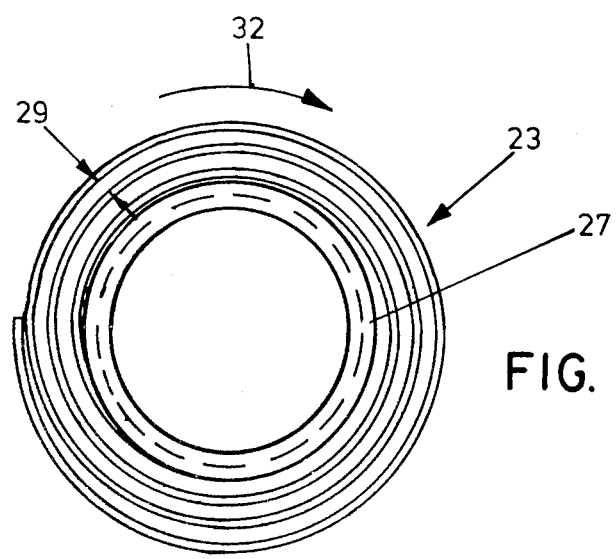
FIG. 6 is a front elevational view of the modified seal ring used in the assembly illustrated in FIG. 5.

The assembly further includes a seal ring 23 in the annular gap between the drill bit body and the inner end of the rotary cutter which is generally similar to the seal ring 19 of the FIG. 4 embodiment except that the spirals run in an axial plane. Also, in the present instance, the inner spiral seats on the axial face of a bearing ring 27 of hard material which slides on the sealing surface or face 26 of the rotary cutter 1. The bearing ring 27 is fixed to the end of the seal ring 23 facing the rotary cutter, for example, by welding. The opposite end of the seal ring 23 which confronts the drill bit body presses radially outwardly because of its inherent elasticity tightly against the bore 28 of the rotary cutter when the cutter is stationary. In this position the rotary cutter is then held radially and axially without play by the seal ring 23 and therefore protected against harmful vibrations during movement of the drill bit body into the drill hole. In this position, as shown in FIG. 6, there is a radial gap in the overlapping portions 14 of the seal ring which is designated in the side view of the seal ring by the numeral 23 and shown enlarged in FIG. 6 by the numeral 29.

In the operation of the drill bit assume the rotary cutter rotating in the direction of the arrow 30 in FIG. 5. With this rotation, the face 31 of the seal ring 23 slides on the radial face of the rotary dril bit at the juncture of the drill bit body and trunnion. Accordingly, the sliding or friction forces act in a peripheral direction as indicated by the arrow 32 in FIG. 6 which tends to elastically compress the seal ring 23 against the bearing ring 27 in a radial direction by reason of the spiral shaped pattern of the windings. As the result of this, the radial gap 29 is reduced to zero and the spirals of the seal ring 23 are in tight contact with one another at their overlapping locations 14 with initial radial tension. Simultaneously the radial gap 33 (FIG. 5.) at the outer periphery of the seal ring is formed between the outer peripheral surface of the seal ring and the bore 28 of the rotary cutter permitting the seal ring to slide freely between the face 26 and the drill bit body without being radially fixed.

In summary therefore, the seal ring of the present invention has the distinct advantage that it does not lose its sealing efficiency as the result of its significant inherent elasticity even with substantial radial, axial and tumbling motions of the rotary cutter which as noted above occurs over a period of use by reason of wear of the bearings. Furthermore, the construction and assembly of the seal ring are relatively simple so that it can be manufactured easily and economically.

Even though specific embodiments of the present invention have been illustrated and described, changes and modifications are possible within the scope of the present invention. For example, in the case of a seal ring with spirals, arranged mutually overlapping in axial direction, the individual spirals do not need to form a narrow sealing gap at their overlapping locations. The seal ring in this case can rather be axially compressed so much during assembly that the individual spirals are mutually in tight elastic contact with each other at their overlapping locations. Moreover, both axial ends of the seal ring can carry a bearing ring of suitable friction resistant material which slides on the appropriate sealing surfaces.

What is claimed is:

1. In a drill bit comprising a cutter rotatably supported by at least one bearing on a trunnion of the drill bit body, the inner axial end of the cutter spaced from the drill bit body and defining an annular gap, a seal ring of flexible metallic strip material of spiral form engaging in the annular gap between the cutter and the drill bit body, the individual spirals of said strip being in overlapping relation, said seal ring oriented in a predetermined manner to rotate relative to the drill bit body or cutter and serve as a forwarding screw thread to effect pumping of any liquid in the area of the annular gap by hydrodynamic action.

2. In a drill bit as claimed in claim 1 wherein said spirals overlap in an axial direction.

3. In a drill bit as claimed in claim 1 wherein said spirals overlap in a radial direction.

4. In a drill bit as claimed in claim 1 wherein said strip is of generally rectangular cross section.

5. In a drill bit as claimed in claim 1 wherein the individual spirals are in mutual contact with each other at their overlapping locations.

6. In a drill bit as claimed in claim 1 wherein the individual spirals form a narrow sealing gap at their overlapping locations.

7. In a drill bit as claimed in claim 1 wherein at least one axial end of the seal ring has a face perpendicular to the axis of the rotary cutter 1.

8. In the drill bit as claimed in claim 1 wherein said strip is coated with a friction reducing material, for example, copper.

9. In a drill bit as claimed in claim 1 wherein at least one axial end of the seal ring carries a bearing ring of hard metal which slides on the appropriate sealing surface.

10. In a drill bit as claimed in claim 1 including a bearing ring which slides on a face of a rotary cutter in the annular gap and means for securing one end of the seal ring to said bearing ring.

11. In a drill bit as claimed in claim 1 wherein the spirals of the seal ring run in an axial plane and when the assembly is at rest there is a radial gap in the overlapping portions of the seal ring whereby upon rotation of the cutter relative to the drill bit body, one face of the seal ring slides on the radial face of the drill bit so that the forces acting in a peripheral direction to elastically compress the seal in a radial direction thereby to close the gap between the spirals.

12. In a drill bit as claimed in claim 1 wherein the seal ring is rotatable with the cutter and relative to the drill bit body.

13. In a drill bit comprising a cutter rotatably supported by at least one bearing on a trunnion of a drill bit body, a seal ring of flexible metallic strip material of spiral form engaging between the cutter and drill bit body, said strip being formed so that the spirals overlap one another in an axial direction and spaced apart axially to form a continuous narrow sealing gap of spiral form, a flow port in the tip of the rotary cutter, the seal ring rotatable relative to the drill bit body or cutter providing for circulation of a flushing fluid through the spiral gap of the spring and the port thereby to effect cooling and lubrication of the bearing.

14. In a drill bit comprising a cutter rotatably supported by at least one bearing on a trunnion of the drill bit body, a seal ring of flexible metallic strip material engaging between the cutter and the drill bit body, the individual spirals of said strip being in overlapping relation, said seal ring being mounted with a predetermined initial axial tension between the cutter and drill bit body so that it rotates with the cutter to provide an elastic bridge and supports the rotary cutter radially and axially without play to protect the same against the harmful vibrations during movement of the drill bit body into a drill hole.

* * * * *